(12) United States Patent
Persson et al.

(10) Patent No.: US 8,828,899 B2
(45) Date of Patent: Sep. 9, 2014

(54) SUPERHARD ELEMENT, METHOD OF USING SAME AND METHOD OF MAKING SAME

(75) Inventors: Stefan Magnus Olof Persson, Umeå (SE); Siu Wah Wai, New South Wales (AU)

(73) Assignees: Element Six Limited, County Clare (IE); Element Six Abrasives S.A., Luxembourg (LU)

(*) Notice: Subject to any disclaimer, the term of this patent is extended or adjusted under 35 U.S.C. 154(b) by 0 days.

(21) Appl. No.: 13/576,001

(22) PCT Filed: Feb. 11, 2011

(86) PCT No.: PCT/EP2011/052030
§ 371 (c)(1),
(2), (4) Date: Oct. 22, 2012

(87) PCT Pub. No.: WO2011/098556
PCT Pub. Date: Aug. 18, 2011

(65) Prior Publication Data
US 2013/0059721 A1    Mar. 7, 2013

(30) Foreign Application Priority Data
Feb. 12, 2010   (GB) .................................. 1002372.9

(51) Int. Cl.
*C04B 35/5831* (2006.01)
*C04B 35/80* (2006.01)

(52) U.S. Cl.
CPC ..... *C04B 35/5831* (2013.01); *C04B 2235/5208* (2013.01); *C04B 2235/5264* (2013.01); *C04B 2235/5244* (2013.01); *C04B 2235/3886* (2013.01); *C04B 2235/3856* (2013.01); *C04B 2235/3865* (2013.01); *C04B 2235/5224* (2013.01); *C04B 2235/3826* (2013.01); *C04B 2235/526* (2013.01); *C04B 2235/3217* (2013.01); *C04B 2235/3843* (2013.01); *C04B 35/806* (2013.01); *C04B 2235/5276* (2013.01); *C04B 2235/3839* (2013.01); *C04B 2235/427* (2013.01)
USPC ............................ 501/95.3; 501/96.4; 51/307

(58) Field of Classification Search
CPC ........................... C04B 35/803; C04B 35/5831
USPC .................................. 501/95.3, 96.4; 51/307
See application file for complete search history.

(56) References Cited

U.S. PATENT DOCUMENTS

| 4,863,881 | A | * | 9/1989 | Ahrens et al. ................... 501/92 |
| 5,948,716 | A | * | 9/1999 | Kume et al. ................... 501/96.4 |
| 6,648,206 | B2 | | 11/2003 | Nelson et al. |
| 6,905,992 | B2 | | 6/2005 | Mehrotra et al. |
| 7,485,278 | B2 | * | 2/2009 | Mehrotra et al. ............. 423/345 |

(Continued)

FOREIGN PATENT DOCUMENTS

CN    101591194 A    12/2009
EP     0699642 A2     3/1996

(Continued)

*Primary Examiner* — Karl Group
(74) *Attorney, Agent, or Firm* — Bryan Cave LLP

(57) ABSTRACT

A superhard element (22) for a machine tool, comprising polycrystalline cubic boron nitride (PCBN) material containing whiskers of a ceramic material, the PCBN material comprising at least about 50 volume percent cubic boron nitride (cBN) material dispersed in a binder matrix comprising a compound including titanium and the whiskers; the content of the whiskers being at least 1 weight percent and at most 6 weight percent of the binder matrix.

4 Claims, 2 Drawing Sheets

(56) References Cited

U.S. PATENT DOCUMENTS

| | | | |
|---|---|---|---|
| 8,354,353 B2 * | 1/2013 | Abds-Sami et al. | 501/96.5 |
| 2006/0191722 A1 | 8/2006 | Belnap et al. | |
| 2008/0209818 A1 | 9/2008 | Belnap et al. | |

FOREIGN PATENT DOCUMENTS

| | | | |
|---|---|---|---|
| JP | 63303029 | * | 12/1988 |
| JP | 01-172270 A | | 7/1989 |
| JP | 01172270 | * | 7/1989 |
| JP | 1172270 A | | 7/1989 |
| JP | 03-013539 | | 1/1991 |
| JP | 3122051 A | | 5/1991 |
| JP | 3164475 A | | 7/1991 |
| JP | 3243735 A | | 10/1991 |
| JP | 4144966 A | | 5/1992 |
| JP | 05-186844 A | | 7/1993 |
| JP | 6239664 A | | 8/1994 |
| JP | 07172922 | * | 7/1995 |
| JP | 7188804 A | | 7/1995 |
| JP | 08169762 | * | 7/1996 |
| JP | 08-239377 | | 9/1996 |
| WO | 2008072180 A2 | | 6/2008 |
| WO | 2009150601 A1 | | 12/2009 |

* cited by examiner

SUPERHARD ELEMENT, METHOD OF USING SAME AND METHOD OF MAKING SAME

BACKGROUND

Embodiments of the invention relate generally to superhard elements, particularly but not exclusively for machining superalloy material, method of making same and method for using same.

A superalloy is an alloy that exhibits excellent mechanical strength and creep resistance at high temperatures, good surface stability, and corrosion and oxidation resistance. The base alloying element is usually nickel, cobalt, or a nickel-iron alloy. Typical applications are in the aerospace, industrial gas turbine and marine turbine industries. An example of a kind of superalloys is austenitic nickel-chromium-based (Ni—Cr) superalloys. Many superalloys, particularly Ni—Cr superalloys, are difficult to machine using traditional techniques due to rapid work hardening. There is a need to provide materials for machine tools for more efficient machining of superalloy materials. In particular, there is a need to provide tools having extended working life when used to machine bodies comprising superalloy materials.

European patent publication number 0 699 642 discloses polycrystalline cubic boron nitride and polycrystalline diamond that are permeated with whiskers and/or fibers, in which the whisker content may comprise anywhere from almost zero to about 30 percent of the total weight of the cBN compact. The cBN content of the compact should be at least 60 weight percent. Consequently, the content of the whiskers in the non-cBN component of the material may be from almost zero to about 75 weight percent, although fewer whiskers result in a compact having less of the desirable qualities the whiskers provide.

SUMMARY

Viewed from a first aspect, there can be provided a superhard cutter element (or simply "superhard element") for a machine tool, comprising polycrystalline cubic boron nitride (PCBN) material containing whiskers of a ceramic material, the PCBN material comprising at least about 50 volume percent or 60 volume percent cubic boron nitride (cBN) material dispersed in a binder matrix comprising a compound including titanium and the whiskers; the content of the whiskers being at least 1 weight percent and at most 6 weight percent of the binder matrix. There can be provided a machine tool for machining a superalloy material, comprising a superhard multiphase material.

Viewed from a second aspect, there can be provided a method of using a superhard element comprising superhard multiphase material, such as PCBN, comprising grains of superhard material, such as cBN grains, and whiskers of a ceramic material dispersed within a matrix, the content of the superhard grains being at least about 30 weight percent; the method including providing a machine tool comprising the superhard multiphase material and using the tool to machine a workpiece body comprising a superalloy.

Viewed from a third aspect, there can be provided a (superhard) PCBN element, the method including combining grains of cBN with grains containing constituent materials for the matrix in a liquid medium to form slurry; shear mixing the slurry; drying the slurry to form granules, combining the granules to form a green body, sintering the green body to form a sintered body and processing the sintered body to form a superhard element for a machine tool.

BRIEF INTRODUCTION TO THE DRAWINGS

Non-limiting arrangements of materials and superhard elements for a machine tool will be described with reference to the accompanying drawings, of which FIG. 1 shows a schematic drawing of a cross-section of a superhard multiphase material on a microscopic scale.

DETAILED DESCRIPTION

Certain terms as used herein are briefly explained below.

As used herein, a superhard material has a Vickers hardness of greater than about 25 GPa. Polycrystalline cubic boron nitride (PCBN) is an example of a superhard material.

A whisker is an elongate strand, fibre or filament of material, the length being substantially greater than the width.

PCBN material comprises grains of cubic boron nitride (cBN) dispersed within a matrix comprising metal or ceramic material. For example, PCBN material may comprise at least about 50 or 60 volume percent cBN grains dispersed in a binder matrix material comprising a Ti-containing compound, such as titanium carbonitride and/or an Al-containing compound, such as aluminium nitride, and/or compounds containing metal such as Co and/or W. Some versions (or "grades") of PCBN material may comprise at least about 80 volume percent or even at least about 85 volume percent cBN grains.

A machine tool is a powered mechanical device, which may be used to manufacture components comprising materials such as metal, composite material, wood or polymers by machining. Machining is the selective removal of material from a body, which may be called a workpiece. A rotary machine tool comprises a cutter element, for example a drill bit, which rotates about its own axis in use. A tipped tool or insert is one in which the cutting edge is formed by a cutter tip comprised of a different material from that of the rest of the tool or insert, the tip typically being brazed or clamped onto a tool body. A tip for a machine tool may be produced by processing a blank body to form it into a configuration for a tip. A rake face of a cutting tool or insert is the surface or surfaces over which chips flow when the tool is used to remove material from a body, the rake face directing the flow of newly formed chips. Chips are the pieces of a workpiece removed from a work surface of the workpiece by a machine tool in use. A cutting edge of a tip is the edge of a rake face intended to perform cutting of a body. The flank is the tool surface or surfaces over which the surface produced on the workpiece by the cutting tool passes (i.e. the surface on the workpiece from which the chip material flowing over the rake face has been cut). When the flank face is composed of a number of surfaces inclined to one another, these are designated first flank, second flank, and so forth, starting from the cutting edge. A clearance surface is sometimes referred to in the art as a flank surface, and may also be composed of a first face, second face and so forth, starting from the cutting edge.

Examples of materials, tips and tools will now be described with reference to FIG. 1 to FIG. 3.

Figure 1:
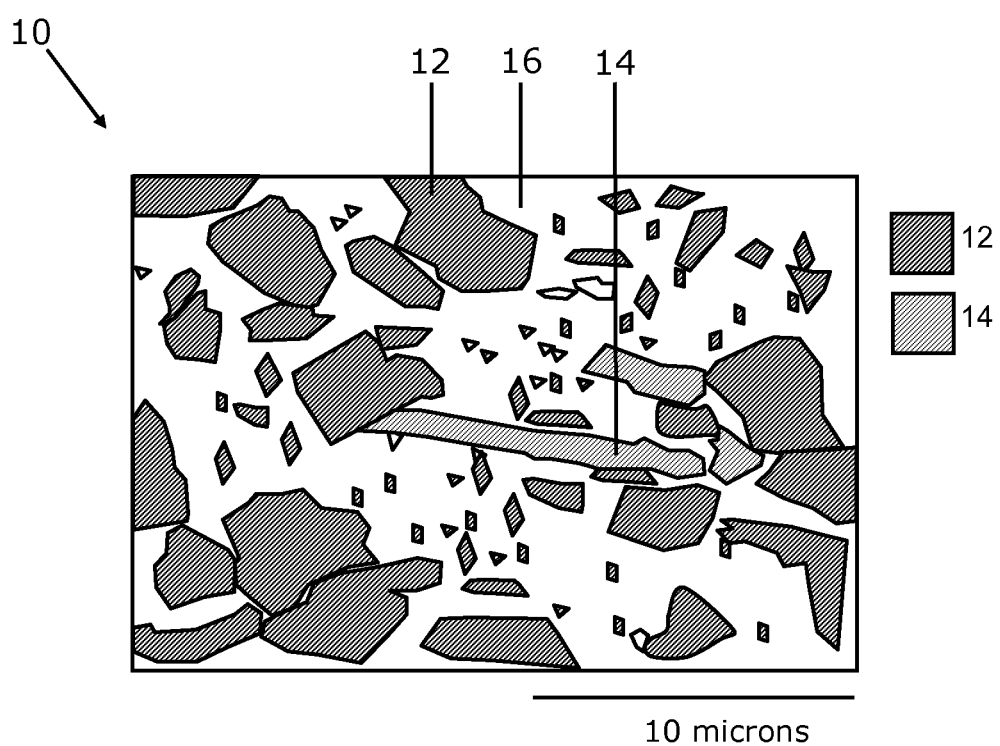

As schematically illustrated in FIG. 1, an example microstructure of a superhard multiphase material 10 may comprise grains of cubic boron nitride 12 and whiskers 14 of ceramic material, such as silicon carbide, dispersed within a matrix 16, the content of the superhard grains being at least about 50 weight percent and the content of the whiskers 14 being at most about 10 weight percent of the matrix. For example, the whiskers 14 may have a mean length in the range from about 5 microns to about 15 microns and a mean width in the range from about 0.5 micron to about 2 microns, or in the range from about 1 micron to about 2 microns.

For example, superhard multiphase material may comprise grains of superhard material and whiskers of a ceramic material dispersed within a matrix, the content of the superhard grains being at least about 30 weight percent, at least about 35 weight percent or at least about 50 weight percent. In other examples, the content of the superhard grains is at least about 60 weight percent or at least about 65 weight percent. In some examples, the grains of superhard material comprise or consist of cBN and the content of the superhard grains is at most about 90 weight percent, at most about 85 weight percent, or at most about 70 weight percent. In some examples, the matrix comprises a metallic, superalloy, ceramic or cermet material.

The matrix may comprise titanium carbonitride and/or chromium. In other examples, the matrix may comprise variants of binder phase material disclosed in PCT patent application publication numbers WO2008/072180 and WO2009/150601, or one or more element selected from carbon, manganese, copper, phosphorus, boron, nitrogen and tin.

In some example superhard multiphase materials such as PCBN material, the content of the ceramic whiskers may be at most about 15 weight percent or at most about 10 weight percent of the matrix. In yet other examples, the content of the whiskers may be at most about 8 weight percent, at most about 6 weight percent, or a most about 5 weight percent of the matrix. The content of the whiskers may be at least about 0.5 weight percent or at least about 1 weight percent of the matrix. Superhard multiphase material may be used for machining a workpiece body comprising a superalloy material. The whiskers may comprise silicon carbide (SiC), diamond, titanium-containing compounds such as titanium carbonitride, titanium nitride, titanium carbide, alumina ($Al_2O_3$) and/or hafnium carbide.

In some examples, the superhard multiphase material comprises grains of cBN and particles of SiC material dispersed within a matrix comprising Ti, the content of the superhard grains being at least about 50 weight percent and the content of the SiC being at most about 10 weight percent of the matrix, at most about 8 eight percent of the matrix, at most about 6 weight percent of the matrix or at most about 5 weight percent of the matrix.

Figure 2:
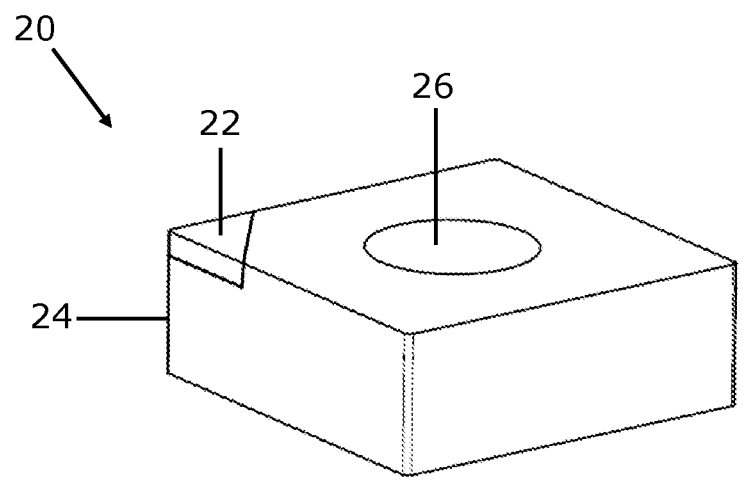
FIG. 2 shows a schematic perspective view of an insert for a machine tool.
Figure 3:
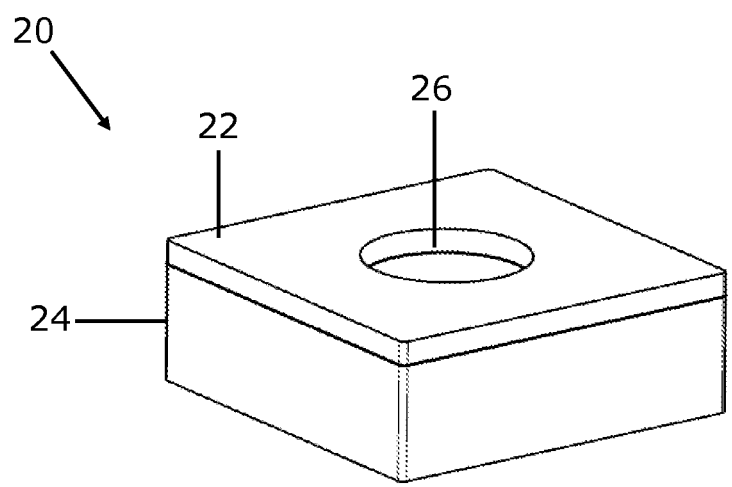
FIG. 3 shows a schematic perspective view of an insert for a machine tool.

With reference to FIG. 2 and FIG. 3, an insert 20 for a machine tool (not shown) may comprise at least one tip defined by a superhard cutter element 22 (or simply "superhard element") joined to a carrier body 24, which may have means 24 for mounting the insert 20 onto a machine tool. For example, the tip may be defined by a superhard element 22 comprising a PCBN structure joined to a cemented carbide substrate, or the superhard element may consist of a PCBN structure 22. The carrier body 24 may comprise cemented tungsten carbide material and the superhard element 22 may be joined to the carrier body by means of braze material. In other arrangements, the insert 20 may comprise a plurality of PCBN structures defining tips, or the insert may comprise a PCBN layer defining a plurality of tips, where the layer covers substantially an entire major end of a substrate, or at least a major portion of the end of a substrate. The insert may comprise a PCBN structure joined to a substrate, the substrate being joined to a carrier body.

An example method of making a superhard multiphase material includes blending grains of superhard material into a precursor powder for the matrix to form a base powder; combining a plurality of ceramic whiskers with an organic binder and solvent to form a slurry; shear mixing the slurry; combining a quantity of the base powder into the slurry; drying the slurry to produce granules; combining the granules to form a green body and sintering the green body to form a sintered body. This approach may have the aspect of resulting in superior bonding between the whiskers and the matrix.

More particularly, an example body comprising PCBN material may be made by blending together powders of TiN and Al, and pre-reacting the powders to form a precursor powder for the matrix. The precursor powder may be attrition milled, and cBN grains may be blended into the milled powder to provide a base powder. Slurry comprising water, PEG (polyethylene glycol) binder, a dispersant to promote suspension and SiC whiskers may be prepared and the slurry subjected to shear mixing. The SiC whiskers may have a mean length in the range from about 5 microns to about 15 microns and a mean width in the range from about 0.5 micron to about 2 microns, or in the range from about 1 micron to about 2 microns. The base powder may then be introduced into the slurry, and the combined material may be subjected to further shear mixing. The slurry of the combined materials may be granulated and dried to form granules, which may be formed into a green body by compacting them together and the green body may be assembled onto a cobalt-cemented tungsten carbide substrate to form a pre-sinter assembly. For example, the green body may have the general form of a disc placed onto an end of substrate also in the general form of a disc. The pre-sinter assembly may be assembled into a capsule for an ultra-high pressure furnace (press), and sintered by means of an ultra-high pressure, high temperature sintering cycle for PCBN to form a superhard multiphase material comprising a PCBN structure integrally bonded to the cemented carbide substrate. The pressure for sintering may be at least about 5 GPa and the temperature may be at least about 1,250 degrees centigrade.

The sintered body (e.g. the PCBN body) may then be processed to form a superhard element, such as a tip or wafer, for use in manufacturing a machine tool. For example, the body may be cut into smaller pieces having a desired shape by means of laser cutting or electro-discharge machining (EDM), and forming cutting edges onto pieces by means including grinding for example. A piece in the form of a tip or wafer may be attached to a carrier body by means of brazing or clamping and the superhard element processed to form an insert for a machine tool. The machine tool may then be used to machine a workpiece comprising superalloy material, such as austenitic Ni—Cr-based superalloy material.

Disclosed PCBN materials have the aspect of yielding surprisingly extended operating lives when used to machine certain superalloy materials, particularly but not exclusively Ni—Cr-based superalloy material such as Inconel™. The operating life may be at least 20 percent or event at least 50 percent longer than those of superhard multiphase materials without the whiskers, which may be sufficiently long for use of the superhard multiphase materials in the machining of superalloys to be commercially viable on an industrial scale. PCBN material disclosed may be particularly (but not exclusively) useful for finishing operations, in which the depth of cut is likely to be at most about 0.5 mm.

A design consideration in selecting the composition of a superhard multiphase material for a superhard element for machining a given kind of workpiece material is to balance wear resistance of the superhard element with its resistance to fracture, such as chipping. In certain applications, the wear resistance of PCBN material is likely to increase as the volume content of cBN material increases in relation to the content of the matrix material, since the hardness and wear resistance of cBN is typically much greater than that of the matrix material. On the other hand, in these same applications the fracture resistance of the PCBN material may be expected to decrease as the content of cBN material increases since the matrix material is likely to be more resistant to fracture than cBN material. An effect of the presence of the ceramic whiskers within the matrix may be to increase the effective toughness and fracture resistance of the PCBN material. While wishing not to be bound by any particular theory, the whiskers may help increase the toughness of the PCBN material, by "crack bridging", for example. However, the wear resistance of the ceramic material of the whiskers, such as silicon carbide, titanium carbide, titanium nitride or titanium carbonitride is substantially lower than that of cBN. The content of the whiskers in the matrix may therefore be useful in determining the balance of properties of the PCBN material for machining particular materials. At least for a class of superalloy materials based on Cr and Ni, it has been found that PCBN material comprising at least about 50 or 60 volume percent cBN and a matrix including a relatively low content of ceramic whiskers in the range from at least about 2 weight percent to at most about 6 weight percent can be effective.

A further non-limiting example is described in more detail below.

EXAMPLE

A PCBN element comprising about 60 weight percent of cBN grains dispersed within a matrix comprising titanium carbo-nitride and SiC whiskers, the content of the SiC whiskers being about 5 weight percent of the matrix, was made as follows:

Powders of TiN and Al were blended together and pre-reacted, as is known in the art to form a precursor powder for the matrix. The precursor powder was attrition milled, and cBN grains were then blended into the milled powder to provide a base powder.

Slurry comprising water, PEG (polyethylene glycol) binder, a dispersant to promote suspension and SiC whiskers was prepared, and the slurry was subjected to shear mixing. The SiC whiskers had a mean length of about 10 microns and a mean width in the range from about 0.7 micron. The base powder was then introduced into the slurry, and the combined material was subjected to further shear mixing. The slurry of the combined materials was granulated and dried to form granules. The granules were formed into a green body by compacting them together and the green body was assembled onto a cobalt-cemented tungsten carbide substrate to form a pre-sinter assembly. The pre-sinter assembly was assembled into a capsule for an ultra-high pressure furnace, and sintered by means of an ultra-high pressure, high temperature sintering cycle for PCBN, as is known in the art, to form a superhard multiphase material comprising a PCBN structure integrally bonded to a cemented carbide substrate.

The microstructure of the PCBN was analysed by means of electron microscopy and it was observed that the whiskers were well integrated with the binder matrix.

The superhard multiphase material was processed by machining and grinding to form an insert for a machine tool suitable for machining a superalloy workpiece. The superhard multiphase material was tested by machining a workpiece formed of Inconel®, comprising a Ni—Cr-based superalloy. A control superhard multiphase material was made as described above, except that whiskers were not introduced, and subjected the same test. In the test, the operating life of superhard multiphase material comprising the SiC whiskers was about 50 percent greater than that of the control element, which was very surprising given the relatively low content of the whiskers. For comparison, a commercially available grade of PCBN, namely the DBC50® grade supplied by Element Six®, was also tested. The operating life of the PCBN element containing the whiskers was about double that of the DBC50® element. It was also observed that notch wear was substantially reduced or eliminated for the PCBN containing the whiskers, which is believed to indicate substantially enhanced fracture toughness.

Details of the machining test are now described. The test workpiece was formed of Inconel 718®, which has a Rockwell hardness of about 42 HRC. The cutting speed was about 300 m/min, the feed rate was about 0.1 mm/rev., the depth of cut was about 0.25 mm and a conventional coolant was used. The end of life criterion were i) a wear scar (VBmax) of 0.3 mm, ii) severe chipping or iii) notch wear.

The test was repeated three times using three different sets of elements. The mean tool life of the PCBN according to the example (i.e. containing whiskers) was about 5.8 minutes, compared to about 4 minutes for the control element and about 2.5 minutes for the DBC50® element.

The invention claimed is:

1. A method of machining a body comprising superalloy material,
   the method comprising selectively removing material from the body with a machine tool,
   wherein the machine tool includes a superhard element comprising polycrystalline cubic boron nitride (PCBN) material containing whiskers of a ceramic material, the PCBN material comprising at least 50 volume percent cubic boron nitride (cBN) material dispersed in a binder matrix containing the whiskers and comprising a compound including titanium; the content of the whiskers being at least 1 weight percent and at most 6 weight percent of the binder matrix.

2. A method as claimed in claim 1, in which the body comprises superalloy material containing Cr and Ni.

3. A method as claimed in claim 1, in which the body is machined using a depth of cut of at most 0.5 mm.

4. A method as claimed in claim 2, in which the body is machined using a depth of cut of at most 0.5 mm.

* * * * *